Figure 2:
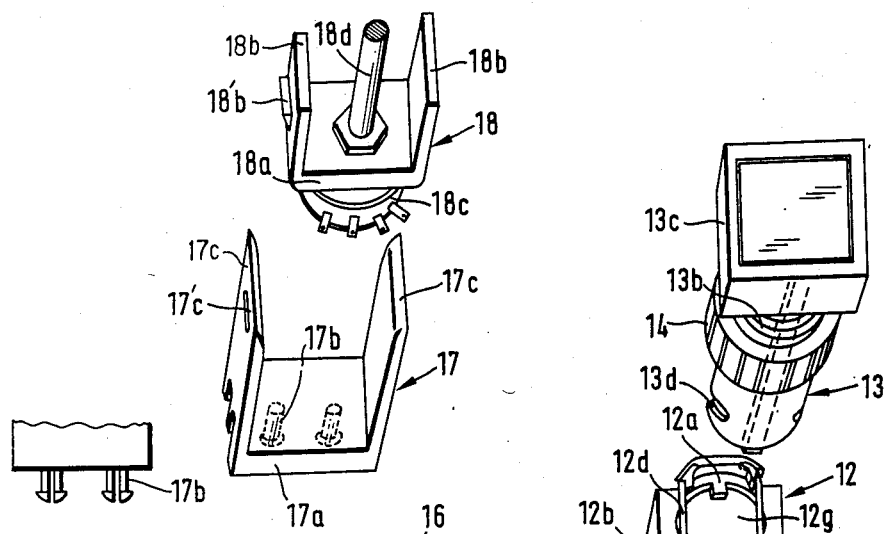

United States Patent [19]

Grunst et al.

[11] Patent Number: 4,697,223
[45] Date of Patent: Sep. 29, 1987

[54] ELECTRICAL APPARATUS, PARTICULARLY APPARATUS FOR INSTALLATION

[76] Inventors: Heinz Grunst, Hubertusweg 24; Heinz Kleine, Neue Strasse 4, both of Marienheide, Fed. Rep. of Germany

[21] Appl. No.: 5,612

[22] Filed: Jan. 8, 1987

Related U.S. Application Data

[63] Continuation of Ser. No. 133,129, Mar. 24, 1980, abandoned.

[51] Int. Cl.$^4$ .............................................. H02B 1/04
[52] U.S. Cl. ................................................... 361/393

[56] References Cited

U.S. PATENT DOCUMENTS

| | | | |
|---|---|---|---|
| 2,469,451 | 5/1949 | Burrus | 248/221.4 |
| 3,207,955 | 9/1965 | Von Hoorn | 361/346 |
| 3,268,774 | 8/1966 | Ortner | 361/393 |
| 3,606,019 | 9/1971 | Dubiel | 361/346 |
| 3,778,566 | 12/1973 | Gusaras | 200/307 |
| 3,903,458 | 9/1975 | Arnoux | 361/346 |
| 3,943,412 | 3/1976 | Wickstrom | 361/331 |
| 4,029,924 | 6/1977 | Frank | 200/307 |
| 4,064,381 | 12/1977 | Mullen | 200/307 |
| 4,094,483 | 6/1978 | Busch | 248/221.4 |

FOREIGN PATENT DOCUMENTS 2152128 6/1978 Fed. Rep. of Germany ...... 200/307

*Primary Examiner*—G. P. Tolin
*Attorney, Agent, or Firm*—Michael J. Striker

[57] ABSTRACT

An apparatus for selective installation of electrical components such as signal lights, switching devices, transformers and the like, includes a mounting housing, a plurality of mounting elements each being formed with two flexible webs arranged opposite each other, the webs of two joining elements slidably fitting each other and the mating surfaces of the webs being provided with flexible dowel connections in the form of a projection on one web and a corresponding recess on the adjoining web; the elements are connectable by resilient split pins to bores on a common rail which receives the electrical components; the housing is provided with upwardly directed hollow dowels connected to spacer sockets and each accommodating a catch spring formed with a detent; the common rail is inserted with its bores onto the dowels until the detents engage the upper surface of the rail and the latter rests on the spacer sockets.

4 Claims, 5 Drawing Figures

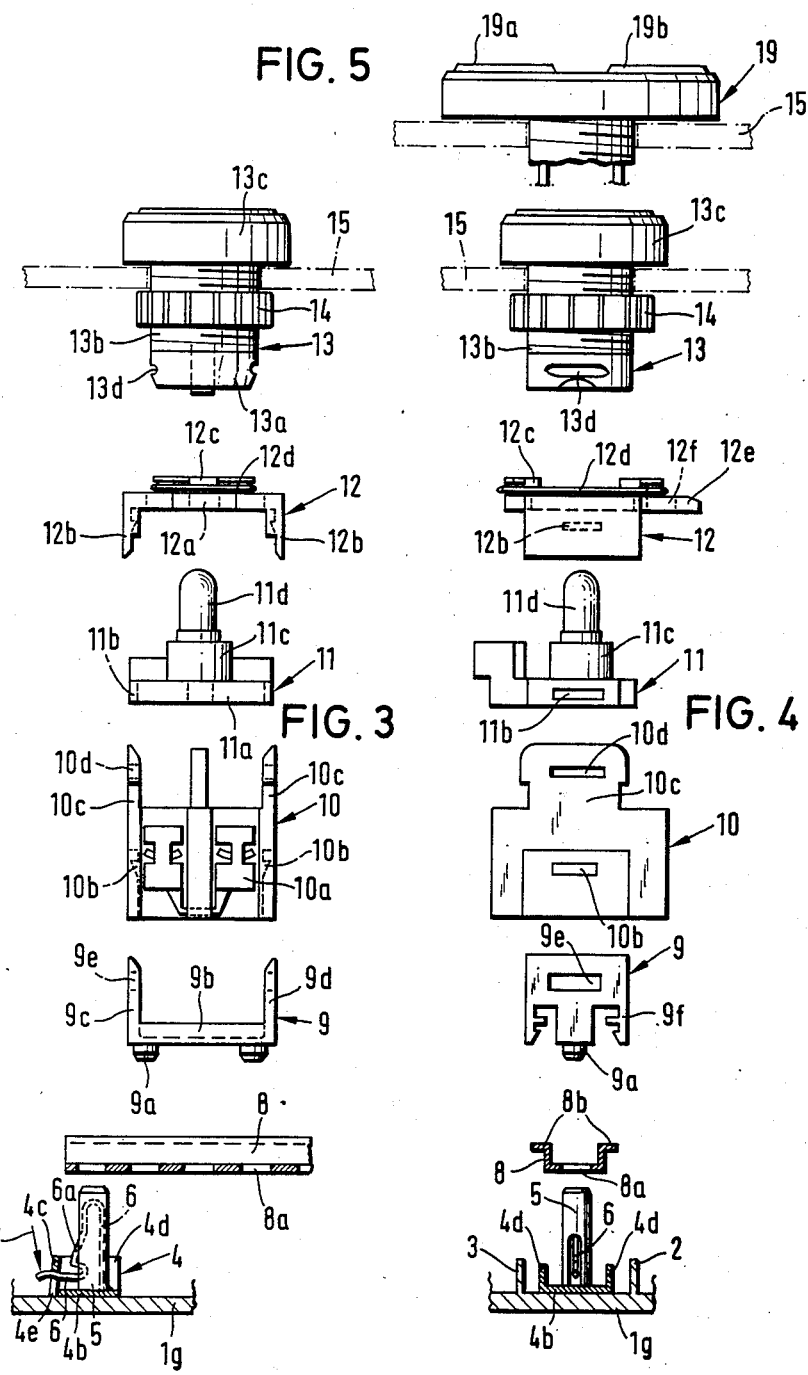

ELECTRICAL APPARATUS, PARTICULARLY APPARATUS FOR INSTALLATION

This application is a continuation of application Ser. No. 133,129, filed Mar. 24, 1980, now abandoned.

The invention relates to an electrical apparatus, particularly apparatus for installation, such as a signal light, switch gear, transformer, or similar, consisting of a plurality of components joinable to each other, for optional installation in an apparatus housing, a switch cabinet, or on a mounting board.

An electrical apparatus for installation, of the aforenamed category, to be mounted in the aperture of a carrier plate is known from DE publication of specifications 26 09 473. This apparatus has a front part with a sleeve shaped neck with an external thread which can be inserted from the exterior through an aperture of the carrier plate as far as a stop, wherein this neck is mountable onto the carrier plate by means of a circular nut that can be threaded against the carrier plate from the interior. For joining to a block containing the electrical components, two segmental ribs, facing each other, are molded onto the free end of the sleeve-shaped neck. These two ribs are provided at their ends with detent projections intended to engage detent grooves. For this purpose, the face of the block to be connected, facing the front wall, is provided with two insertion apertures conforming to the sectional shape of the ribs. On inserting the ribs of the front part into the apertures of the block, the detent projections of the ribs will engage the detent grooves of the block. Furthermore, a guide space is provided transversal to the central longitudinal axis of the block, within which a latch is held laterally movable, serving for fixing the ribs within the block by abutting these.

It is of disadvantage in this apparatus for installation, that a relatively large space is required on the side of the apparatus to allow lateral inserting of the latch securing the detents and to withdraw it again upon detaching the components. A further essential disadvantage consists in the segmental rib at the sleeve-shaped neck of the front part having to be inserted into the conformingly shaped insertion apertures of the face of the block. The ribs and detents can neither be seen nor checked from the exterior; in their assembled position they are therefore neither reachable nor operable from the exterior, i.e. they cannot be made to engage or release the detents. The laterally insertable latch is thus required under all circumstances, in order to effect securing of the detents at all. This means, however, cumbersome manipulations on assembling the individual components of the apparatus for installation on one hand, and on the other this will result in a relatively complicated design.

Contrary to the aforegoing, the invention is based on the object of creating an electrical apparatus wherein individual components of simple design and low space requirements will allow easy assembling and detaching of the individual components, and wherein secure attachment of the components is nevertheless ensured.

The object as set is attained as per invention by the components being detachably joined to each other and the apparatus housing or switching cabinet, by means of lateral, externally visible and operable elastic elements engaging detents. Further advantageous embodiments of the invention derive from the subordinate claims.

The drawing represents in a schematic, embodiments of the invention, showing in

Figure 1:
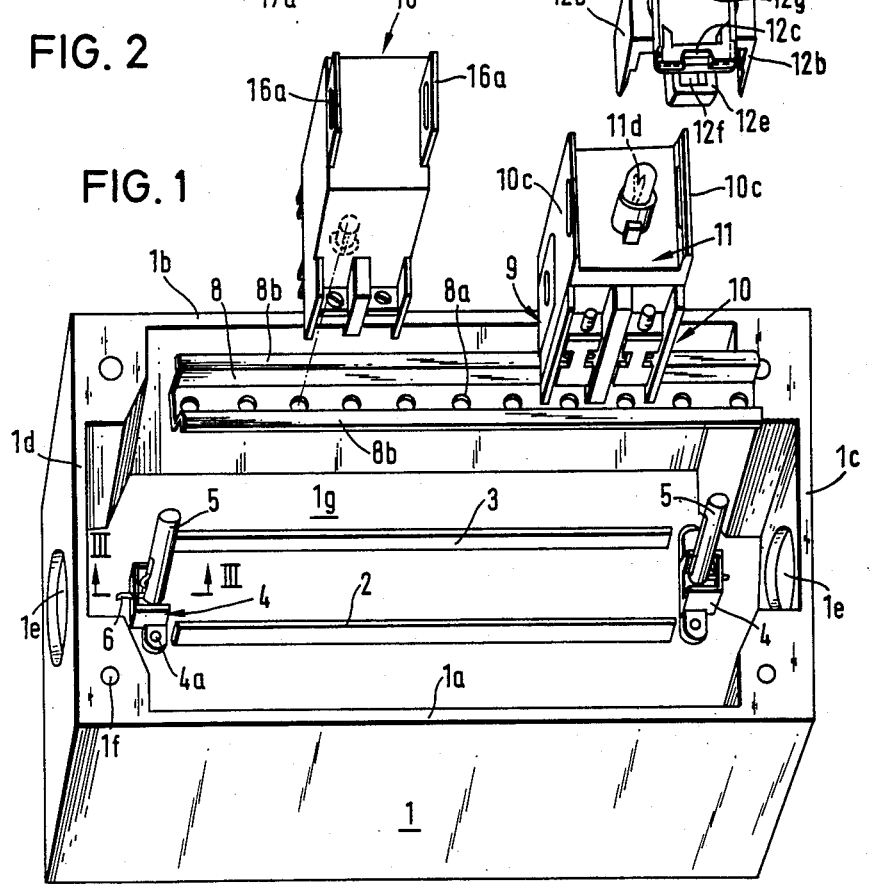

FIG. 1 a perspective view of an electrical apparatus with a plurality of components, represented at a distance from each other FIG. 2 a detail in a fragmentary view, FIG. 3 the components corresponding to FIG. 1 in front view, also at a distance to each other, FIG. 4 a side view to FIG. 3, and FIG. 5 an individual component of different configuration, in a fragmentary side view.

The embodiment shown in FIG. 4 is an electrical apparatus intended to be accommodated in total within an apparatus housing it. It may, however, be particularly emphasized, that the purpose will also be served by using, instead of the housing 1, a switch cabinet as known per se, or a board as, for instance, shown in dot-dash lines in FIGS. 3, 4 and 5, and referenced therein by 15. The invention will thus not limit itself to the selection of the mounting or accommodation of the electrical apparatus.

It is furthermore to be noted in advance, that those parts of the electrical apparatus hereinafter simply called components, and intended for selective assembling, may be of different nature. The components may, f.i., be in the shape of signal lights or indicator lights of any type, or as switching apparatus which may be actuated in the manner as known per se, by means of push buttons, locking keys, etc. Furthermore, transformers, potentiometers and other components, as customarily assembled in switching cabinets, mounting boards, etc., may also be used herein.

In the components represented by the drawings, the internal electrical equipment is not shown in detail since this is not essential to the invention. Of essential significance, however, is the manner of assembling the components and their releasable connection with each other and with the respective carrier, i.e. either with the apparatus housing, the switching cabinet or the respectively present mounting board.

Using FIGS. 1 to 5, a particularly advantageous embodiment of an apparatus for installation will be described. The apparatus housing 1, intended to accommodate all components, consists in essence of longitudinal side walls 1a, 1b, two cross walls 1c, 1d with apertures 1e for leading electrical cables in and out, and the floor 1g. The corners of the apparatus housing may be reinforced and provided with threaded bores if allowing to screw onto it a common housing cover, not shown in the drawing, which is provided with cutouts corresponding to the number of the individual apparatus contiguously arranged in the housing and described hereinafter, with the heads of the apparatus with their keys or switches etc. projecting through the recesses outward to the operator side.

Two longitudinal support rails 2, 3 are provided on the floor 1g of the apparatus housing 1, for supporting flanges 8b of U-shaped common rail 8. The common rail 8 serves for accommodation of a plurality snap-in components arranged side by side, as will be explained more closely hereinafter. This purpose is served by the bores 8a arranged in series at a requisite distance from each other, which may be engaged by dowels of the components, for instance, by elastic dowels 17b as per FIG. 2. The split pins or dowels 17b have external projections at their ends, so shaped that after insertion into the bores 8a they will engage the detent and ensure a firm hold, but will allow simple release if the need arises.

The attachment of the rail 8 in the apparatus housing 1 is effected by lateral elastic components 6 visible and operable from the exterior through the apertures 1e. The engaging components are illustrated in the lower portion of FIGS. 3 and 4. The rail 8 is slid with each of the two outer bores, over one respective hollow dowel. Every hollow dowel holds a bent spring 6, so shaped that the rail is held in detents, i.e. when being slid over the offset portion 6a of the spring. Pressing in the direction of the arrow 7 onto the free spring end projecting outward, this offset portion is moved arcuately, anticlockwise, into the interior of the hollow dowel, so that the rail 8 may be detached again from the hollow dowel. The hollow dowel 5 is located within a socket 4 open at the top.

Two box-like open sockets 4, each provided with an upwardly projecting hollow pin or dowel 5, are disconnectably secured by screws 4a, for example, to the floor 1g of the apparatus housing. A U-shaped catch spring 6 is accommodated in each dowel 5. One arm of spring 6 is shaped to form a detent 6a which projects through a guiding slot in the dowel, and the free end portion of this arm is offset substantially parallel to the bottom plate 4b and projects through an opening in an end wall 4c of the socket.

The end bores 8a of the common rail 8 are placed over the corresponding dowels 5 and the rail 8 is slid downwardly until its flanges 8b rest on the support rails 2 and 3 and the resilient detents 6a pass through the end bores 8a and snap over the upper surface of the bottom of the common rail.

By pressing in the direction of arrow 7 (FIG. 3) onto the projecting free end portion of the spring 6, the shaped one arm of the spring together with the detent 6a is moved counterclockwise into the interior of dowel 5 and the common rail may be detached from the housing.

Attaching of the rail 8 in the manner described will be effected however only after the components have been contiguously attached on the rail in the number and composition desired.

The components may be arranged as desired. In the embodiments shown in the drawing, an intermediate piece 9 is initially arranged, which at the lower side of a bottom part 9b is provided with projecting dowels for insertion into the bores 8a of the rail 8. Furthermore essentially flat ribs 9c, 9d are provided being elastical and having detent recesses 9e which act conjointly with the detents 10b of a component 10 to be attached thereonto. As shown in FIG. 4 in a side view onto the intermediate piece 9, further detent projections 9f can be provided which, for instance, will elastically engage over the flanges of the rail 8 and effect an additional hold.

The component 10 may, for instance, be a transformer or a switching apparatus, or simply an electrical connector with screwed clamps 10a, for connection to electric lines. Instead of a transformer, a resistor together with a diode may be provided within the same housing. This component has the advantage of being a solution, at favorable cost, for the reduction of voltage when compared with the expense for a transformer.

The component 10 is again provided with two opposite, essentially flat, ribs 10c with detent recesses 10d, wherein the latter will receive corresponding detents or projections 11b of a further superimposed component 11. In the present instance, this component is provided with a lamp socket 11c and an incandescent lamp 11d.

A further interposed component 12 follows, combining two connecting functions, e.g. once by the two flat ribs 12b projecting downward herein, again laterally and externally visible and operable, engaging elastic detents of the lower component 11. It is understood that the center portion 12a as per FIG. 1 will have a large central aperture to allow passage of an incandescent lamp and lamp socket. The second function, e.g. connection with an upper contiguous component 13 is accomplished by means of a somewhat U-shaped spring 12d which is held in the intermediate element 12 in such a manner, that the two parallel legs of the spring will partially be located within the large central aperture 12g. By this, elastical components to engage detents, are created again, detently herein in grooves 13d of the head 13 of a signal lamp. This signal lamp head consists essentially of a hollow cylinder with an outer thread 13b onto which a holding ring 14 can be threaded in the manner as known per se, should it be desired to effect attachment on a mounting board or, within a switch cabinet, if so desired in the respective design. At the outer end of the cylinder, provision is made, for instance, for locating a round or rectangular head 13c with a colored translucent disc. In another version, a push key or similar may be provided. As per FIG. 5, a head 19 with two or a plurality of signal lamps 19a, 19b or with push keys may be attached on a common cylinder. To release the detent engagement between the components 12 and 13, the former is provided with a U-shaped bracket 12e, as well as apertures 12c and 12f. Herein, inserting of a screw driver allows in a simple manner to move outward the ends of the legs of the spring 12d bent inward, thus releasing the detent so that the component 13 with its hollow cylinder may be pulled out from the aperture 12g of the component 12.

In the left portion of FIG. 1 a different assembly of the components 16 and, respectively 17 or 18, can be seen. The component 16 may again engage the rail 8 by means of dowels corresponding to the dowels 17b of FIG. 2, while the oppositely arranged flat ribs 16a at the upper side will serve for attaching to, or respectively, connecting with, other suitable components. The component 17 with bottom plate 17a, the attachment dowels 17b at the lower side, and the two upper oppositely arranged flat ribs 17c, will serve here again as an intermediate element, for instance for connection with a variable resistor or a potentiometer, the electrical portion 18c of which, with its rotating axis 18d, is held in a center piece 18a of a U-shaped holder 18 whose elastic legs 18b at both sides of the center piece 18a are provided with detent projections 18'b to engage the detent grooves 17'c of the component 17.

As can be seen from the above, all components are connected in a consistent manner amongst each other and also with the apparatus housing or, respectively, the switch cabinet or the mounting board, by lateral elastic elements externally visible and operable, this, in such a manner, that a connection is effected only by mutual engagement. Releasing these detents may be made however if so desired in a simple manner from the exterior, for instance by means of a screw driver. In addition, it is possible to externally check every detent for correct engagement.

We claim:

1. An electrical component container assembly for installation of electrical components, such as signal lights, switching devices, transformers and the like, comprising a container housing; a common rail detachably mounted in said housing and being formed with a series of mounting bores; a plurality of separate mounting components each having a central part and two opposite lateral legs, said lateral legs being formed with detents and detent recesses; at least one of said mounting components having its central part provided with split dowels fitting said mounting bores in the rail, another mounting component having lateral legs of elastic material; the detents and detent recesses of the two mounting components locking into one another; the central part of said other mounting component supporting at least one of said electrical components; and arresting means secured to said housing and releasably engaging said common rail.

2. The assembly as defined in claim 1 wherein the central part of said other mounting component is provided with an opening for receiving an intermediate mounting component, said intermediate mounting component being formed with a peripheral groove, and a U-shaped spring secured in said opening and engaging said groove.

3. The assembly as defined in claim 1, wherein said arresting means includes at least one spacer socket secured to said housing, an upwardly projecting hollow pin secured at one end thereof to said socket and defining a guiding slot, and a U-shaped spring disposed in said hollow pin and having one arm shaped into a detent projecting through said guiding slot, said hollow pin being insertable into one of said mounting bores in said common rail so that the rail rests on the spacer socket and said detent engages the upper surface of the rail.

4. The assembly as defined in claim 3, wherein said U-shaped spring has a free spring end, said detent being released by pressure exerted on said spring end to thus release said common rail.

* * * * *